April 24, 1951      J. W. MacCLATCHIE      2,550,487
ROD WIPER

Filed Nov. 30, 1945

JOHN W. MacCLATCHIE,
INVENTOR.

BY Robert M. McManigal

ATTORNEY.

Patented Apr. 24, 1951

2,550,487

UNITED STATES PATENT OFFICE 2,550,487

ROD WIPER

John W. MacClatchie, Los Angeles, Calif.

Application November 30, 1945, Serial No. 631,884

1 Claim. (Cl. 15—210)

This invention relates to a means for wiping pipe, tubing, and the like, as the pipe or tubing, or the like, is lowered into or raised from a well hole.

In use in the well hole, the wiper is positioned between the rotary table and the well head and has many advantages, some of which are that it cleans the pipe without the use of water, keeps the derrick floor free of slippery mud, and the drilling fluid is not diluted by the water that is otherwise used to wash the pipe.

An object of my invention is to provide a wiper which is efficient in operation and which is capable of withstanding considerable usage.

Another object of my invention is to provide a wiper which is so shaped as to provide a space radially outward from the inner portion of the wiper so that the inner portion of said wiper may be moved to said space when said inner portion is moved radially outward, as when collars, connecting joints, drill pipe protectors, and the like, are moved through said wiper.

My invention has many other objects, advantages, and features, some of which, with the foregoing, will be set forth at length in the following description where I shall outline one form of my invention, which I have selected for illustration in the drawings accompanying and forming a part of the present specification.

Figure 1:
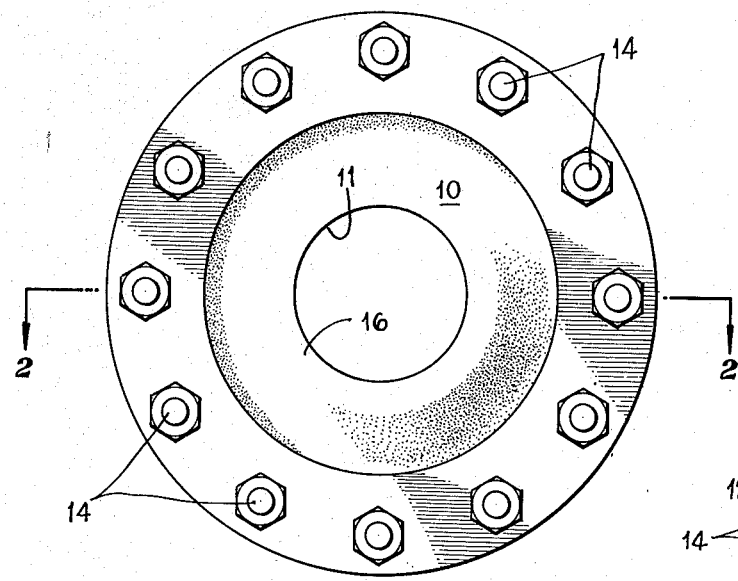
Figure 1 is a plan view of one form of the wiper of my invention.
Figure 3:
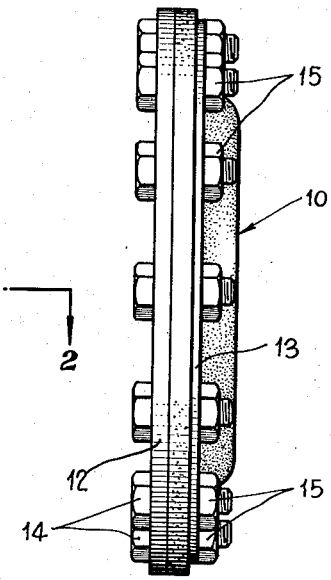
Figure 3 is an end view of the wiper shown in Figure 1.
Figure 2:
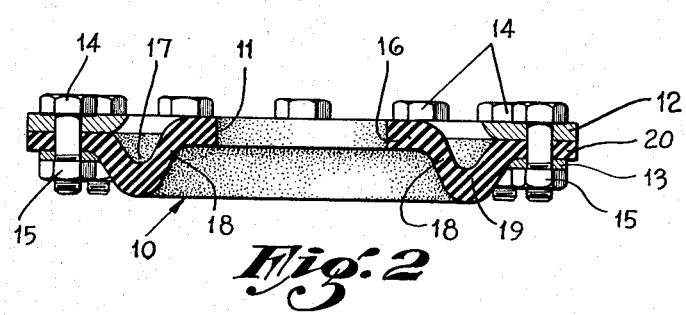
Figure 2 is a sectional view taken along the line 2—2 of Figure 1.

Referring to the drawings, the numeral 10 indicates a resilient disc-like body or member, having an opening 11 at its center in order to allow for the passage of a well string or the like. The opening 11 is somewhat smaller than the outside diameter of the pipe, tubing or the like, for which the wiper is adapted for use. In extending outwardly from the central opening 11, the wiper body first extends radially at 16, then in a direction having a first axial component at 18, then in a direction having a component in a reversed axial direction at 19, and finally radially outwardly at 20. In the claims, the inner radial portion 16 and axial portion 18 are considered to comprise an inner section, while axial portion 19 and outer radial portion 20 are referred to together as an outer section.

The outer radially extending portion of the member 10 may be reinforced by means of a metallic ring 12 which may be secured to the member 10 by any convenient means, for example, by means of another metallic ring 13, bolts 14 and nuts 15.

Annular recess or groove 17 is formed between the radially spaced axially extending portions 18 and 19 and provides a space into which the inner portions 16 and 18 of the wiper are resiliently expansible, as when a collar, connecting joint, pipe protector or other enlargement passes through the wiper. The inner axially extending portion 18 of body 10 is preferably of narrower width than the inner radial portion 16 or outer axial portion 19 in order to provide the point of flexing at said point of narrower width. Having the point of flexing at this point enables easier movement of the inner portion 16 of the resilient member into the annular groove 17.

From the foregoing description taken in connection with the accompanying drawings, the uses, advantages, and operation of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claim.

I claim:

A wiper comprising a generally annular body having a central opening for passing a well string and forming a wiping edge extending about said opening, said body in extending radially outwardly from said wiping edge including an annular inner section near the opening extending first substantially radially outwardly and then in a direction having a component in a first axial direction, and said body then being deflected back at the outside of said inner section in a direction having a component in the reverse axial direction to form with the portion having said first axial component an annular recess into which the inner section is partially expansible upon passage of an enlargement therethrough, the minimum thickness of said portion having the first axial component being less than the minimum thickness of either said radial portion or said portion having the reversed axial component to thereby assure that maximum flexing of the body will occur at said portion having the first axial component.

JOHN W. MacCLATCHIE.

(References on following page)

REFERENCES CITED

The following references are of record in the file of this patent:

UNITED STATES PATENTS

| Number | Name | Date |
|---|---|---|
| 789,430 | Jewson | May 9, 1905 |
| 1,287,285 | Gammeter | Dec. 10, 1918 |
| 1,605,577 | Bruen | Nov. 2, 1926 |
| 2,162,104 | Mosher | June 13, 1939 |
| 2,215,377 | Penfield et al. | Sept. 17, 1940 |
| 2,272,395 | Ballagh | Feb. 10, 1942 |
| 2,392,146 | Hall | Jan. 1, 1946 |
| 2,444,653 | Kennedy et al. | July 6, 1948 |

FOREIGN PATENTS

| Number | Country | Date |
|---|---|---|
| 810,376 | France | Dec. 28, 1936 |